INVENTORS
SOLOMON RUBINSTEIN
GEORGE S. EAGER JR.
BY
ATTORNEYS

United States Patent Office 3,389,460
Patented June 25, 1968

3,389,460
MANUFACTURE OF BARE OR PRE-INSULATED METAL CLAD SODIUM CONDUCTOR
Solomon Rubinstein, Fanwood, and George S. Eager, Jr., Upper Montclair, N.J., assignors to General Cable Corporation, New York, N.Y., a corporation of New Jersey
Filed July 7, 1966, Ser. No. 563,531
11 Claims. (Cl. 29—624)

This invention relates to methods of making sodium conductors.

Sodium is a good conductor of electricity and is light in weight, but its use in conductors has been very limited because the metal is not stable in the presence of moisture, and the construction of composite conductors in which the metal is protected from moisture has presented practical difficulties.

It is an object of this invention to provide an improved method of making sodium conductors, and more especially for making sodium conductors of substantial length with the sodium protected from contact with moisture in the surrounding atmosphere. The invention is suitable for making either bare or pre-insulated metal cladded sodium conductors.

It is a more particular object of the invention to provide an improved method of making composite electrical conductors consisting of a sodium core and aluminum cladding on the core in the form of a metal tube that is filled with sodium. In place of aluminum, copper or various other metals can be used.

This invention fills the cladded tube with the sodium by causing a column of molten sodium to rise in the tube; and in order to get long conductors, the tube may be coiled. Sodium conductors with metal cladding can be made of indefinite length.

Some features of the invention relate to safety and the insurance of uniform results.

Other objects, features and advantages of the invention will appear or be pointed out as the description proceeds.

In the drawing, forming a part hereof, in which like reference characters indicate corresponding parts in all the views.

Figure 1:
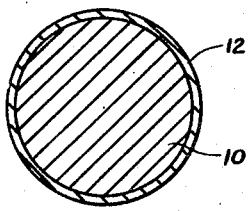
FIGURE 1 is a sectional view of a metal cladded sodium conductor made in accordance with this invention.

The metal cladded sodium conductors made by this invention may be bare conductors, as shown in FIGURE 1, with a sodium core 10 and a cladding tube 12. The tube 12 is preferably made of aluminum because aluminum is a good conductor of electricity and is light in weight and inexpensive. Other materials can be used for the cladding tube, however, such as copper or steel, the latter being stronger than aluminum but having less desirable electrical and corrosive characteristics.

In order to reduce the weight and cost of the conductor, the cladding 12 is made with a relatively thin wall. In the preferred construction, the radial thickness of the cladding is less than 0.2 times its outside radius.

Figure 2:
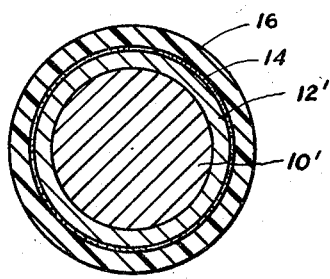
FIGURE 2 is a view similar to FIGURE 1 but illustrating the invention with pre-insulated metal tubing as the cladding.

FIGURE 2 shows a sodium core 10' with cladding 12'. This cladding 12' is covered with adhesive 14 extending around the entire outside surface of the claddding, and there is a layer of electrical insulation 16 over the cladding 12' and secured to the cladding by the adhesive 14. Any conventional electrical insulation can be used, preferably chemically cross-linked polyethylene, polyethylene, polyvinyl chloride, or rubber, and this insulation may be applied to the cladding tube 12' before or after the tube is filled with the sodium core 10'. Some insulations can be applied with sufficient adhesion without use of the adhesive 14.

Figure 3:
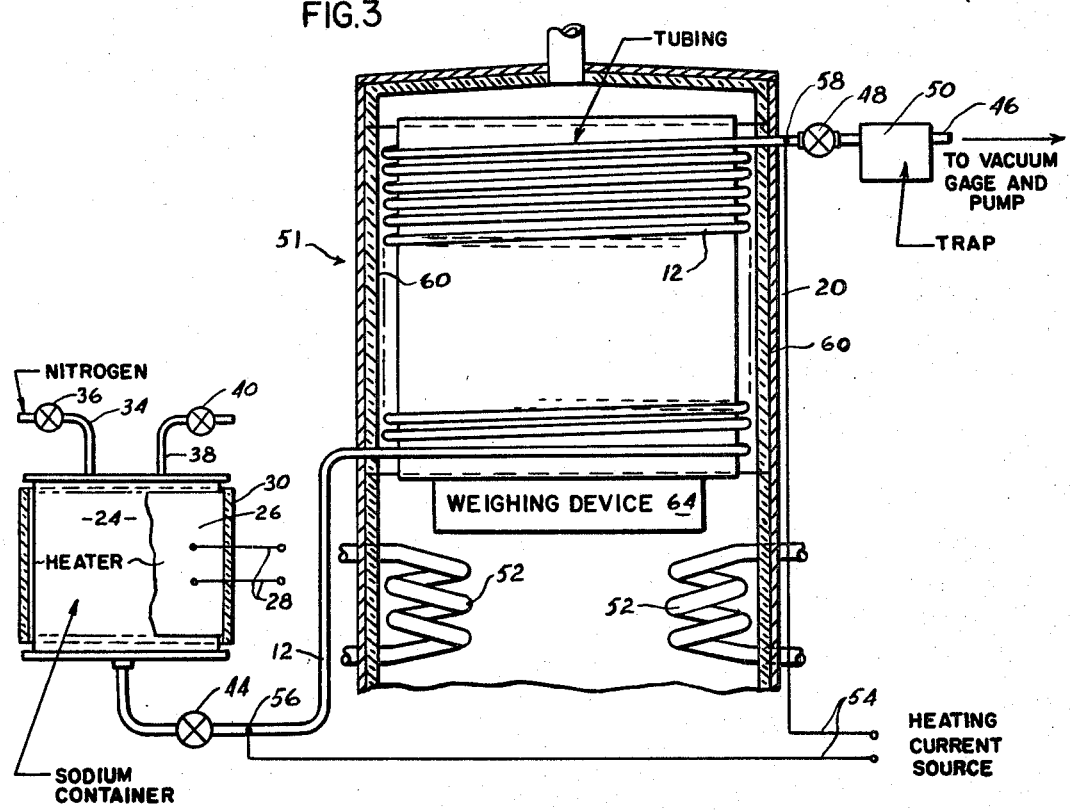
FIGURE 3 is a diagrammatic view showing the method of this invention for making metal cladded sodium conductors.
Figure 4:
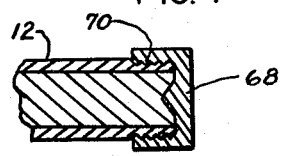
FIGURE 4 is a sectional view showing one method of protecting the ends of the metal cladded sodium conductor from the atmosphere.

FIGURE 3 shows the method by which the cladding tube 12 is fille with sodium 10. The same process can be used for the pre-insulated cladding tube 12'. The cladding tube is wrapped around a core 20, preferably a cylindrical core, with successive convolutions of the tube spaced or otherwise insulated from one another.

The lower end of the tube 12 is connected with a container 24 filled with molten sodium. A heater jacket 26 surrounds the container 24 and this heater jacket is shown as an electrical heater supplied with power from a power line 28. There is a heat-insulating jacket 30 surrounding the container 24 outside of the heater jacket 26.

In order to protect the molten sodium in the container 24 from the moisture and oxygen in the atmosphere, an inert atmosphere is supplied to the container 24 through an inlet pipe 34. Nitrogen may be used as the inert atmosphere. The inlet pipe 34 is commanded by a shut-off valve 36. There is an outlet pipe 38 for venting the container 24, and this outlet pipe is commanded by a shut-off valve 40.

A valve 44, at the bottom of the sodium container 24, is opened when sodium is to be introduced into the cladding tube 12. At the opposite end of the cladding tube there is a vacuum line 46 leading to a vacuum pump and guage. A valve 48 is located between the end of the cladding tube 12 and the vacuum line 46, and there is preferably a trap 50 in series with the valve 48 and line 46.

If the cladding tube 12 is not too long, the pressure over the molten sodium in the container 24 is maintained at substantially atmospheric pressure, and the molten sodium is drawn into the cladding tube 12 by the reduced pressure at the upper end of the cladding tube. In order to prevent solidification of sodium on the walls of the cladding tube and resulting partial obstruction to flow to the upper portions of the cladding tube, the cladding tube is maintained at a temperature above the melting point of sodium (97.5° C.) and preferably at a temperature of 110–120° C. This temperature may be maintained in various ways. For example the entire reel containing the aluminum tube or the pre-insulated aluminum tube may be placed in an oven 51 heated by steam coils 52 sufficiently to maintain the above temperature. Other means of heating may be used for example the aluminum tube may be heated electrically by an electric power line 54 with one side connected to the lower end of the tube 12 at 56 and the other side connected with the upper end of the cladding tube 12 at 58. Sufficient current flows through the tube between the locations 56 and 58 to maintain the temperature within the desired range. The oven has heat-insulating material 60 to conserve heat. The steam coils 52 or the electric heat from power line 54 can be used alone, if desired; or other heating means can be used.

The tube 12 is heated before introducing molten sodium into it. Thus, prior to and during the heating of the coil of tube, the valve 44 is closed and the valve 48 is open slightly so that the vacuum pump evacuates a substantial portion of the air from within the tube 12. If the sodium is to be introduced into the coiled tube with a pressure head of atmospheric pressure in the container 24, both of the valves 36 and 40 are open during the filling operation and these valves are adjusted so that there is a light flow of the inert gas, such as nitrogen, from the outlet pipe 38. If more pressure is needed, the valve 40 is closed further or closed entirely to permit the inert gas pressure to build up as necessary over the molten sodium in the container 24.

When the proper temperature and pressure conditions have been stabilized, the valve 44 is opened and the molten sodium flows into the coiled tube 12, displacing the air above it as the level of the sodium rises. A positive determination of complete filling of the tube 12 is obtained by waiting until a trickle of sodium enters the trap 50, and at such time the valves 44 and 48 are promptly closed. If desired, the core 20 and the tubing 12 can be supported on a weighing system 64 for determining the degree and rate of fill of the tube 12.

When using an electric current to heat the tube 12, as illustrated in FIGURE 3, it is necessary that the successive convolutions of the bare metal cladding tube be spaced from one another on the core 20, so that the electric current will travel the full length of the tube. If the cladding tube is pre-insulated, then the convolutions may be wound on the core 20 in contact with one another.

After filling, the tube 12 is allowed to cool so that the sodium core within the tube solidifies and the tube is then unwrapped from the core 20 and coiled on a spool for shipping. In order to protect the sodium core at the ends of the tube 12, a cap 68 is screwed over threads 70 which are formed on the ends of the tube before it is filled. These same threads 70 are used for connecting the tube with the filling apparatus. The cap 68 can be used as part of any connector for joining the cladded sodium conductor with another length of conductor or with any termination fitting.

It is preferable to have the container 24 at a lower level than the coiled tube 12, and it is desirable to have the sodium move upwardly in the tube 12 during the entire filling operation. However, where extremely long lengths of tube are to be filled, and a single helix would be of prohibitive axial length, the invention can be carried out by winding the cladding tube 12 back and forth on the core 20 so as to form superimposed helixes, or the end of one helix can be brought down in a substantially axial direction to start a second superimposed helix which wraps in the same upward direction as the first helix.

The preferred embodiment of the invention has been illustrated and described, but changes and modifications can be made and some features can be used in different combinations without departing from the invention as defined in the claims.

What is claimed is:

1. The method of making a metal clad sodium conductor which comprises melting the sodium and establishing a reservoir of liquid sodium, placing one end of a preformed electrically conductive tube that forms the cladding for the sodium in communication with the reservoir, heating the tube to above the melting point of sodium, flowing sodium into the tube by establishing a differential between the pressure over the sodium in the reservoir and the pressure at the opposite end of the tube, continuing the sodium flow until the cladding tube is filled for a predetermined length across the full inside diameter of the cladding tube and sealing the tube to prevent escape of the sodium.

2. The method of making a conductor as described in claim 1 characterized by the cladding tube being located with its inlet end lower than the rest of the tube, and the molten sodium being supplied to the tube through said inlet end and being advanced upward in the tube to displace fluid ahead of it in the cladding tube.

3. The method of making a conductor as described in claim 2 characterized by the cladding tube being disposed in a generally helical shape with its axis extending substantially vertically, and the molten sodium being advanced upward in the helically disposed cladding tube until the tube is completely filled with sodium, and then hermetically sealing the cladding tube at both ends to protect the sodium core from contact with the atmosphere surrounding the cladding tube.

4. The method of making a conductor as described in claim 1 characterized by the molten sodium being protected by an inert atmosphere before being inserted into the cladding tube, and the air within the cladding tube being rarified ahead of the sodium by applying suction to the interior of the tube ahead of the sodium to produce a sub-atmospheric pressure above the sodium in the cladding tube.

5. The method of making a conductor as described in claim 1 characterized by maintaining the cladding tube heated to a temperature above the melting point of the sodium during the time that the cladding tube is being filled with sodium and permitting the filled tube to cool below the melting point of sodium.

6. The method of making a conductor as described in claim 1 characterized by passing an electric current through the cladding tube during the filling time to maintain the temperature of the cladding tube, and insulating the cladding tube against escape of heat to the outside during the filling time.

7. The method of making a conductor as described in claim 1 characterized by maintaining the entire length of the cladding tube between about 110–120° C. during the time that the tube is being filled with sodium.

8. The method of making a conductor as described in claim 1 characterized by continuing the flow of molten sodium until sodium escapes from the end of the cladding tube, and then shutting off the flow of sodium at the overflow.

9. The method of making a conductor as described in claim 1 characterized by applying electrical insulation to the outside of the cladding tube before introducing the sodium into the tube, the cladding tube being located with its inlet end lower than the rest of the tube and the molten sodium being supplied to the tube from said inlet end and being advanced upward in said tube until the molten sodium escapes from the upper end of the cladding tube, then shutting off the flow of sodium at the upper end of the tube permitting the filled tube to cool to a temperature below the melting point of sodium and sealing the tube to protect sodium from contact with the ambient atmosphere, the cladding tube being disposed in a generally helical shape during the filling and being maintained throughout its length, at a temperature between about 110–120° C. while filling it, and preventing the escape of heat from the tube by surrounding the helix with a heat-insulating jacket while filling the cladding tube with sodium.

10. The method described in claim 9 characterized by maintaining the temperature by passing an electric current through the length of the tube.

11. The method described in claim 9 characterized by enclosing the tube in an oven and heating the oven to maintain the tube at said temperature between about 110–120° C.

References Cited

UNITED STATES PATENTS

| | | |
|---|---|---|
| 833,290 | 10/1906 | Betts. |
| 2,712,384 | 7/1955 | Corneil. |
| 2,841,866 | 7/1958 | Schilling _____ 29—423 |
| 3,349,832 | 10/1967 | Crowdes et al. |

OTHER REFERENCES

T. Koning, The Cooling of Electric Machines and Cables, published 1957 by author, Library of Congress, catalog card No. 57—14783, pp. 213 and 214.

JOHN F. CAMPBELL, *Primary Examiner.*

PAUL M. COHEN, *Examiner.*